(12) United States Patent
Matthews et al.

(10) Patent No.: US 7,063,906 B2
(45) Date of Patent: Jun. 20, 2006

(54) FUEL CELL SYSTEM AND METHOD FOR OPERATING THE SAME

(75) Inventors: Derek Matthews, Windsor (CA); Alan Mulvenna, North Vancouver (CA); Ed J. Peters, Surrey (CA); Gerhard Schmidt, Vancouver (CA)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 467 days.

(21) Appl. No.: 10/298,154

(22) Filed: Nov. 15, 2002

(65) Prior Publication Data

US 2003/0148155 A1 Aug. 7, 2003

(30) Foreign Application Priority Data

Nov. 15, 2001 (EP) .................................. 01127101

(51) Int. Cl.
*H01M 8/04* (2006.01)
(52) U.S. Cl. .............................. 429/26; 429/22; 429/13; 429/24

(58) Field of Classification Search ..................... None
See application file for complete search history.

(56) References Cited

U.S. PATENT DOCUMENTS 6,584,789 B1 * 7/2003 Ishikawa ..................... 62/171
2002/0015870 A1 * 2/2002 Cownden et al. ............. 429/19

FOREIGN PATENT DOCUMENTS

DE 43 27 261 C1 10/1994

* cited by examiner

*Primary Examiner*—Michael Barr
*Assistant Examiner*—Karie O'Neill
(74) *Attorney, Agent, or Firm*—Crowell & Moring LLP

(57) ABSTRACT

A fuel cell system comprises a fuel cell having an anode and a cathode, a fuel feed line connected to the anode, an oxidant feed line connected to the cathode and a cathode exhaust line. A water collecting unit is connected to the cathode exhaust line, and a cooling circuit comprising a radiator is configured to cool the fuel cell. A nozzle is connected to the water collecting unit and configured to spray water onto the radiator.

15 Claims, 1 Drawing Sheet

FUEL CELL SYSTEM AND METHOD FOR OPERATING THE SAME

CROSS-REFERENCE TO RELATED APPLICATION

This application claims priority to European Patent Application No. 01127101.2, filed Nov. 15, 2001, which application is incorporated herein by reference in its entirety.

BACKGROUND OF THE INVENTION

1. Field of the Invention

The invention relates to a fuel cell system and a method for operating the same.

2. Description of the Related Art

During operation of a fuel cell system where hydrogen is used as the fuel, water and heat are produced by the reaction of hydrogen and oxygen in the fuel cell stack. In fuel cell systems equipped with polymer electrolyte membrane fuel cells (PEM fuel cells), the operating temperature is rather low, usually below 100° C. The fuel cell stack is cooled by a radiator that dissipates the heat produced to the surroundings. Such a fuel cell system is disclosed in DE 43 27 261 C1. The cooling efficiency of such a fuel cell system is dependent on the ambient temperature and the size of the radiator.

Accordingly, there generally remains a need for improved fuel cell systems, particularly with regard to increased cooling efficiency. The present invention fulfills one or more of these needs, and provides further related advantages.

BRIEF SUMMARY OF THE INVENTION

In brief, this invention is directed to a fuel cell system and a method for operating the same, wherein the cooling efficiency of the fuel cell system is enhanced.

In one embodiment, the present fuel cell system comprises a fuel cell having an anode and a cathode, a fuel feed line connected to the anode, an oxidant feed line connected to the cathode, a cathode exhaust line, a water collecting unit connected to the cathode exhaust line, a cooling circuit comprising a radiator and configured to cool the fuel cell, and a nozzle connected to receive water from the water collecting unit and configured to spray water onto the radiator.

In one embodiment, the present fuel cell system comprises a fuel cell having an anode and a cathode, a fuel feed line connected to the anode, an oxidant feed line connected to the cathode, an anode exhaust line, a cathode exhaust line, a water collecting unit connected to the cathode exhaust line, a cooling circuit comprising a radiator and configured to cool the fuel cell, and a nozzle connected to receive water from the water collecting unit and configured to spray water onto the radiator.

In one embodiment, the present method for operating a fuel cell system comprises feeding a fuel to an anode of a fuel cell, feeding oxidant to a cathode of the fuel cell, collecting water from an exhaust line of the fuel cell in a water collecting unit, cooling the fuel cell using a cooling circuit comprising a radiator, and spraying water from the water collecting unit onto the radiator.

These and other aspects of this invention will be apparent upon reference to the attached figure and following detailed description.

DETAILED DESCRIPTION OF EMBODIMENTS

Figure 1:
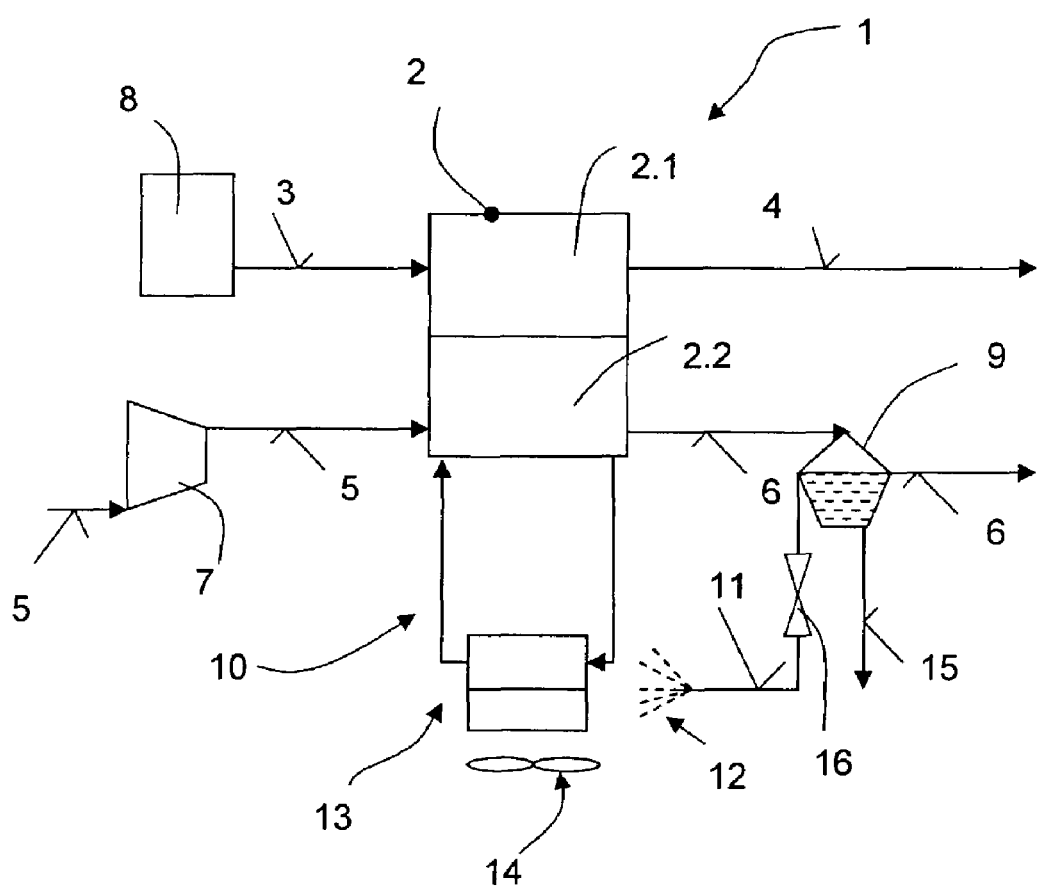
FIG. 1 shows a schematic illustration of an embodiment of the present fuel cell system.

In fuel cell systems equipped with polymer electrolyte membrane fuel cells (PEM fuel cells), product water formed during operation of the fuel cell may be collected from a fuel cell exhaust line in a condenser or a gas/liquid separator and be used in the fuel cell system. In this way, the product water is available, for example, for humidification of the fuel cell reactant streams and/or for water-steam reforming reactions in a hydrogen gas production system in reformer-type fuel cell systems. However, when the condenser or gas/liquid separator is full, excess product water must generally be discharged.

FIG. 1 shows an embodiment of the present fuel cell system. Fuel cell system 1 comprises a fuel cell 2, typically a fuel cell stack, having a plurality of individual fuel cells stacked together to produce a desired amount of electric power. Fuel cell 2 has an anode 2.1, with an anode feed line 3 for feeding hydrogen to anode 2.1 and an anode exhaust line 4 to remove the exhaust from anode 2.1, and a cathode 2.2, with a cathode feed line 5 for feeding oxidant to cathode 2.2 and a cathode exhaust line 6 to remove the exhaust from cathode 2.2. If the system is operated on substantially pure hydrogen, the anode exhaust comprises mainly surplus hydrogen and water from fuel cell 2, and it may be possible to dispense with anode exhaust line 4 and operate in a dead-ended mode, with periodic venting or purging of non-reactive components. If the system is operated on a dilute hydrogen fuel stream, such as a reformate stream, an anode exhaust line 4 will generally be required.

The oxidant for cathode 2.2 is typically air, which is fed to a compressor 7 by line 5 and is compressed by compressor 7 to an appropriate operating pressure.

Fuel cell system 1 typically utilizes hydrogen as a fuel and may comprise a hydrogen gas production system 8 wherein hydrogen is produced by reforming a process fuel stream in gas production system 8. Suitable process fuels include alcohols, ethers, esters or other hydrocarbons, such as natural gas, or other fuels such as gasoline.

As shown in FIG. 1, a water collecting unit 9, such as a condenser and/or a gas/liquid separator, is arranged in cathode exhaust line 6. The cathode exhaust typically comprises most of the product water formed during fuel cell operation. Water extracted from a fuel cell exhaust, such as the cathode exhaust, can be recycled into fuel cell system 1 via line 15 for humidification of the fuel cell reactant streams and/or use in chemical reactions in hydrogen gas production system 8, if necessary. In a further embodiment of the present invention, a second water collecting unit 9 may be arranged in anode exhaust line 4.

Cooling of fuel cell 2 is performed by a cooling circuit 10 which connects fuel cell 2 to a radiator 13. A coolant can be circulated through fuel cell 2 and radiator 13. Radiator 13 is cooled by a fan 14.

As further illustrated in FIG. 1, water from water collecting unit 9 is directed via line 11 to radiator 13 and is sprayed, via a nozzle 12, onto radiator 13. As the water evaporates from radiator 13, heat is removed from radiator 13. In this way, the cooling efficiency of radiator 13 is enhanced by utilizing the heat of evaporation.

Typically, water is taken from water collecting unit 9 only if the level of water in water collecting unit 9 is above a certain level. Additionally, water is only sprayed onto radiator 13 if there is a certain amount of water available in water collecting unit 9. In further embodiments of the present fuel cell system and method, water is only sprayed onto radiator 13 if more water is available in the fuel cell exhaust than can be collected in water collecting unit 9.

As shown in FIG. 1, a valve 16 is arranged in line 11, upstream of nozzle 12, and is configured to control the spray of water onto radiator 13. In a further embodiment, water collecting unit 9 contains a water level sensor (not shown). Additionally, a control unit (not shown) can be employed to open or close or adjust valve 16 according to the level of water in water collecting unit 9. The water level corresponding to the availability of sufficient water in water collecting unit 9 may be adjusted based on the electrical power output of fuel cell 2.

In another embodiment of the present fuel cell system, the amount of water sprayed onto radiator 13 is dependent on the demand on cooling circuit 10. This embodiment is advantageous when the ambient temperature rises, resulting in a lower temperature difference between the surroundings and the fuel cell and a corresponding reduction in the efficiency of radiator 13. Furthermore, in very low ambient temperatures, the spray can be shut off to prevent water from freezing on radiator 13.

Given the improved heat transfer characteristics of radiator 13 with the spraying, the present fuel cell system can allow for a reduction in the size of radiator 13. Additionally, as the water used for the spraying procedure is supplied by the fuel cell system itself, the present invention may be employed without much extra system cost or complexity. The present invention is advantageous in vehicles where a fuel cell system is used to supply electric energy for traction and/or low power requirements.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A fuel cell system comprising:
    a fuel cell having an anode and a cathode;
    a fuel feed line connected to the anode;
    an oxidant feed line connected to the cathode;
    a cathode exhaust line;
    a water collecting unit connected to the cathode exhaust line;
    a cooling circuit comprising a radiator and configured to cool the fuel cell; and
    a nozzle connected to the water collecting unit and configured to spray water from the water collecting unit onto the radiator.

2. The fuel cell system of claim 1, further comprising a water level sensor configured to determine the level of water in the water collecting unit.

3. The fuel cell system of claim 2, further comprising a control unit electrically connected to the water level sensor, and configured to control the spray of water onto the radiator in dependence on the water level.

4. The fuel cell system of claim 1, further comprising an anode exhaust line, a second water collecting unit connected to the anode exhaust line, and a nozzle connected to the second water collecting unit and configured to spray water onto the radiator.

5. The fuel cell system according to claim 1, further comprising an anode exhaust line.

6. The fuel cell system of claim 5, further comprising a water level sensor configured to determine the level of water collecting unit.

7. The fuel cell system of claim 6, further comprising a control unit electrically connected to the water level sensor, and configured to control the spray of water onto the radiator in dependence of the water level.

8. A method for operating a fuel cell system comprising:
    feeding a fuel to an anode of a fuel cell;
    feeding oxidant to a cathode of the fuel cell;
    collecting water from at least one of a fuel or oxidant exhaust of the fuel cell in a water collecting unit;
    cooling the fuel cell using a cooling circuit comprising a radiator; and
    spraying water from the water collecting unit onto the radiator.

9. The method of claim 8 wherein the amount of water sprayed onto the radiator depends on a volume of water in the water collecting unit.

10. The method of claim 9 wherein water is sprayed onto the radiator only when the volume of water in the water collecting unit is greater than a threshold volume.

11. The method of claim 8 wherein the amount of water sprayed onto the radiator depends on the electrical power output of the fuel cell system.

12. The method of claim 8 wherein the amount of water sprayed onto the radiator depends on the demand on the cooling circuit.

13. The method of claim 8 wherein the amount of water sprayed onto the radiator depends on the ambient temperature.

14. A method of generating electric power, comprising:
    using a fuel cell to generate electric power;
    cooling said fuel cell by circulating a cooling fluid through the fuel cell and through a radiator;
    recovering water from an exhaust of said fuel cell; and
    spraying recovered water to cool said radiator.

15. The method according to claim 14, further comprising collecting recovered water in a reservoir, wherein said step of spraying said recovered water on said radiator is performed only when a volume of water in said reservoir exceeds a preset quantity.

* * * * *